(12) United States Patent
Nielsen et al.

(10) Patent No.: US 10,018,183 B2
(45) Date of Patent: Jul. 10, 2018

(54) ROTATING SYSTEM FOR A WIND TURBINE

(75) Inventors: Thomas Korsgaard Nielsen, Vejle (DK); Simon Schjøtt, Åbyhøj (DK); Jens Demtroder, Rønde (DK)

(73) Assignee: Vestas Wind Systems A/S, Aarhus N. (DK)

( * ) Notice: Subject to any disclaimer, the term of this patent is extended or adjusted under 35 U.S.C. 154(b) by 1218 days.

(21) Appl. No.: 13/994,640

(22) PCT Filed: Dec. 15, 2011

(86) PCT No.: PCT/DK2011/050482
§ 371 (c)(1),
(2), (4) Date: Sep. 3, 2013

(87) PCT Pub. No.: WO2012/079584
PCT Pub. Date: Jun. 21, 2012

(65) Prior Publication Data
US 2013/0336766 A1    Dec. 19, 2013

Related U.S. Application Data

(60) Provisional application No. 61/423,360, filed on Dec. 15, 2010.

(30) Foreign Application Priority Data

Dec. 15, 2010 (DK) .................................. 2010 70547

(51) Int. Cl.
*F03D 80/70* (2016.01)
*F16N 7/36* (2006.01)
*F03D 11/00* (2006.01)

(52) U.S. Cl.
CPC .......... *F03D 11/0008* (2013.01); *F03D 80/70* (2016.05); *F16N 7/36* (2013.01); *F05B 2260/98* (2013.01); *Y02E 10/72* (2013.01)

(58) Field of Classification Search
CPC .......... F01D 9/065; F16C 33/10; F16N 31/00; F16N 7/36; F05D 2260/602; F05D 2260/98; F03D 11/0008; Y02E 10/722
(Continued)

(56) References Cited

U.S. PATENT DOCUMENTS 4,365,851 A    12/1982  Helmut et al.
5,494,355 A *  2/1996  Haase ..................... F01D 9/065
                                                    384/135

FOREIGN PATENT DOCUMENTS

DE           309837 C     4/1916
DE    102007029469 A1 *  1/2009  .......... F03D 11/0008
(Continued)

OTHER PUBLICATIONS

European Patent Office, Office Action issued in corresponding European Application No. 11 799 352.7 dated Feb. 25, 2015, 3 pages.
(Continued)

*Primary Examiner* — Laert Dounis
*Assistant Examiner* — Kelsey Stanek
(74) *Attorney, Agent, or Firm* — Wood Herron & Evans LLP (57) ABSTRACT

A rotating system (1), such as a gear system or a bearing supporting system, for a wind turbine is disclosed. The rotating system (1) comprises a housing (2) arranged to substantially enclose the rotating system (1), said housing (2) defining a lubricant drain (5) towards the exterior of the housing (2), and a rotating part (3) accommodated in an interior part of the housing (2) in a manner which allows rotational movements of the rotating part (3) relative to the housing (2), and in such a manner that lubricant can be contained between the housing (2) and the rotating part (3). The housing (2) and/or the rotating part (3) is/are arranged to provide a pumping action forcing lubricant arranged in an interior part of the housing (2) towards the lubricant drain (5) during rotational movements of the rotating part (3) relative to the housing (2). Excess lubricant is quickly and efficiently removed from the rotating part (3) and led to the lubricant drain (5). Thereby a slip stream of lubricant is reduced. Accordingly, the friction occurring in the rotating (Continued)

system (1) is considerably reduced, and the efficiency of the rotating system (1) is therefore increased. Simultaneously, the outer dimensions of the rotating system (1) can be minimized because it is not necessary to generally increase the distance between the rotating part (3) and the housing (2) in order to avoid a lubricant slip stream. Furthermore, a method for operating such a rotating system (1) is disclosed.

12 Claims, 5 Drawing Sheets

(58) Field of Classification Search
USPC .................. 415/1, 110; 384/144, 135, 403
See application file for complete search history.

(56) References Cited

FOREIGN PATENT DOCUMENTS

| | | |
|---|---|---|
| DK | 647332 C | 7/1937 |
| GB | 1503111 A | 3/1978 |
| SU | 796587 A1 | 1/1981 |

OTHER PUBLICATIONS

International Searching Authority, Search Report issued in corresponding PCT Application No. PCT/DK2011/050482 dated May 3, 2012, 4 pages.

Danish Patent Office, DK Search and Examination Report issued in corresponding DK Application No. PA201070547 dated Jul. 22, 2011, 6 pages.

* cited by examiner

ROTATING SYSTEM FOR A WIND TURBINE

FIELD OF THE INVENTION

The present invention relates to a rotating system, such as a gear system or a bearing support system, for a wind turbine. More particularly, the rotating system of the invention is of a kind in which friction can be reduced and efficiency improved. The present invention further relates to a wind turbine comprising such a rotating system.

BACKGROUND OF THE INVENTION

Rotating systems, such as gear systems or bearing support systems, of wind turbines require lubrication by special lubricants, e.g. in the form of greases or oils. It is well known that the rotating parts in such systems cause slip streams in the lubricant. These slip streams may potentially disturb the lubricant circulation, with noticeable negative impact on the operation of the rotating system.

Accordingly, it is desirable to design rotating systems in a manner which minimises the lubricant slip streams. On the other hand, in modern wind turbines it is desirable to minimise the outer dimensions of large components, including gear system and bearing support systems, in order to be able to accommodate the components in the nacelle of the wind turbine. This may be obtained by minimising the distance between moving and non-moving parts of the rotating system. However, this aggravates the slip stream problem described above.

GB 1 359 321 discloses a transmission unit having coaxial input and output members. A non-rotatable lubricant-feed member through which an arbor extends is located between the input and output members and is arranged to receive lubricant from splashing or spray within a casing and convey the lubricant to the surface of the arbor at a region at which its diameter is not greater than that of its journals. The lubricant is directed along the surface of the arbor to the interior of the bore. The lower part of the gearcase is widened to act as a sump to contain lubricating oil into which the lower extremities of the layshaft gears dip.

U.S. Pat. No. 6,021,868 discloses a cooling and lubrication system for a mechanical change gear transmission including a first conduit for providing pressurized lubricating fluid from the engine and a second conduit for returning lubricating fluid to the engine. Lubrication may be provided in a dry-sump operating arrangement through a manifold which distributes lubricating fluid among transmission components. A splash lubrication arrangement controls the level of lubricating fluid by appropriate positioning of the transmission outlet port.

DESCRIPTION OF THE INVENTION

It is an object of embodiments of the invention to provide a rotating system for a wind turbine, the rotating system allowing operation which is more energy efficient than prior art rotating systems without significantly increasing the outer dimensions of the rotating system.

It is a further object of embodiments of the invention to provide a rotating system for a wind turbine, the rotating system allowing smaller outer dimensions than prior art rotating systems without significantly reducing the energy efficiency of the rotating system.

It is an even further object of embodiments of the invention to provide a rotating system for a wind turbine in which the temperature control of the rotating system is improved without significantly increasing the outer dimensions of the rotating system.

According to a first aspect the invention provides a rotating system for a wind turbine, the rotating system comprising:
- a housing arranged to substantially enclose the rotating system, said housing defining a lubricant drain towards the exterior of the housing,
- a rotating part accommodated in an interior part of the housing in a manner which allows rotational movements of the rotating part relative to the housing, and in such a manner that lubricant can be contained between the housing and the rotating part, wherein the housing and/or the rotating part is/are arranged to provide a pumping action forcing lubricant arranged in an interior part of the housing towards the lubricant drain during rotational movements of the rotating part relative to the housing.

In the present context the term 'rotating system' should be interpreted to mean a system, a part or a component of a wind turbine where at least one part rotates relative to another part during normal operation of the wind turbine. Examples of rotating systems for wind turbines include, but are not limited to, gear systems, such as main gear systems forming part of a drive system for the wind turbine, pitch gear systems or yaw gear systems, or bearing systems.

In the present context the term 'wind turbine' should be interpreted to mean a modern type wind turbine comprising a nacelle arranged rotatably on the top of a tower construction, the nacelle carrying a set of wind turbine blades arranged to extract energy from the wind, transforming the extracted energy into a rotational movement, and transforming the rotational movement into electrical energy, which is finally supplied to a supply grid.

The rotating system comprises a housing arranged to substantially enclose the rotating system. Thus, the housing defines an outer boundary of the rotating system, the remaining parts of the rotating system being arranged within this outer boundary. Preferably, the housing is substantially closed in the sense that it is capable of substantially confining lubricant to the interior part of the housing.

The housing defines a lubricant drain towards the exterior of the housing. Lubricant is allowed to leave the housing, and thereby the rotating system, via this lubricant drain. The lubricant drain may form an integral part of the housing, i.e. it may be manufactured directly along with the housing. As an alternative, the lubricant drain may be a separately manufactured part which is attached to or mounted on the housing. The lubricant drain is used for controlling the lubricant level in the interior part of the housing by allowing excess lubricant to leave the interior part of the housing via the lubricant drain.

The rotating system further comprises a rotating part accommodated in an interior part of the housing. The rotating part is capable of performing rotational movements relative to the housing, and it is arranged inside the housing in such a manner that lubricant can be contained between the housing and the rotating part. This allows the entire rotating part to be lubricated while the rotating part performs rotational movements.

The housing and/or the rotating part is/are arranged to provide a pumping action forcing lubricant arranged in an interior part of the housing towards the lubricant drain during rotational movements of the rotating part relative to the housing. Thus, the design of the rotating system, more particularly the design of the housing, the design of the rotating part or a combination of the design of the housing and the design of the rotating part, ensures that lubricant is automatically pumped towards the lubricant drain, and thereby out of the housing, when the rotating part rotates relative to the housing. Accordingly, excess lubricant is quickly and efficiently removed from the rotating part and led to the lubricant drain. Thereby it is prevented that lubricant is dragged along by the rotating part, and a slip stream of lubricant is thereby prevented or at least substantially reduced. Accordingly, the friction occurring in the rotating system is considerably reduced, and the efficiency of the rotating system is therefore increased. Simultaneously, the outer dimensions of the rotating system can be minimised because it is not necessary to increase the distance between the rotating part and the housing in order to avoid a lubricant slip stream.

Furthermore, during lubrication of rotating parts, the temperature of the lubricant is normally increased because the rotating part produces heat and the lubricant is to some extent used for cooling the rotating part. It is therefore desirable to remove lubricant from the rotating system and supply new, cooler, lubricant instead in order to provide sufficient cooling to the rotating part. It is therefore an advantage of the present invention that the lubricant is efficiently and automatically forced towards the lubricant drain when the rotating part rotates relative to the housing.

The lubricant drain may be arranged in a lower region of the housing. According to this embodiment, the lubricant in the interior part of the housing is moved towards the lubricant drain due to gravity, as well as due to the pumping effect provided by the housing and/or the rotating part and described above. Thus, the pumping effect works along with gravity rather than against gravity.

The lubricant drain may be arranged at the lowest point of the housing. Thereby lubricant will flow towards the lubricant drain, due to gravity, even if the rotating part is not performing rotating movements relative to the housing, and the pumping effect is therefore not present. As an alternative, the lubricant drain may be arranged in a (slightly) higher position, though in such a manner that the pumping effect forces the lubricant towards the lubricant drain during rotation of the rotating part.

As another alternative, the lubricant drain may be arranged in an upper region of the housing, in which case the pumping effect works against gravity when forcing the lubricant towards the lubricant drain. According to this embodiment, the lubricant level in the housing must be expected to increase when the rotating part is not performing rotating movements relative to the housing, and the pumping effect is therefore not present.

The housing may have a cross sectional shape which is substantially elliptical. According to this embodiment, a rotational symmetrical rotating part may be arranged inside the housing in such a manner that a relatively small distance is defined between a wall part of the housing and the rotating part along most of a periphery defined by the rotating part, while a larger distance is defined along the remaining part of the periphery. In this case the pumping effect may advantageously be operating in the part of the periphery where the relatively small distance between the wall part of the housing and the rotating part is defined, and the pumping effect may be absent in the part of the periphery where the larger distance is defined. Thereby it is ensured that the lubricant is forced towards the part of the periphery where the larger distance is defined, and the lubricant will remain in this region of the housing. The lubricant drain may, thus, be arranged in this part of the housing.

Furthermore, the substantially elliptical shape represents a very strong construction, and a desired strength of the housing can thereby be obtained with a relatively low material thickness. Thereby the weight of the rotating system is minimised, and manufacturing costs are reduced.

The rotating part may be arranged in the interior part of the housing in such a manner that the rotating part is arranged closer to a wall of the housing in an upper region of the housing than in a lower region of the housing. This may, e.g., be achieved by providing the housing with a substantially elliptical cross section as described above. As an alternative, the upper part of the housing may follow the shape of the rotating part, thereby allowing the rotating part to be arranged close to a wall part of the housing in the upper region, while the lower part of the housing has a different shape, e.g. defining a substantially rectangular cross section. Similarly to what is described above, the pumping effect may advantageously be present in the upper region of the housing where the rotating part is arranged closer to a wall part of the housing, while it may not be present in the lower region of the housing, where the rotating part is arranged further away from a wall part of the housing. Thereby the lubricant will be pumped towards the lower region of the housing when the rotating part performs rotational movements relative to the housing, i.e. it is ensured that the lubricant is forced away from the upper region where there is little space for accommodating the lubricant between the rotating part and the housing, and towards the lower region where there is more space for accommodating the lubricant. This reduces the problems described above relating to lubricant slip stream. The lubricant drain may advantageously be located in the lower region of the housing.

The housing may define a flow resistor arranged to inhibit lubricant flow in the region accommodating the flow resistor. According to this embodiment, the lubricant is substantially prevented from entering into and/or passing the region accommodating the flow resistor. Accordingly, the flow resistor helps in guiding the lubricant towards a region adjacent to the region accommodating the flow resistor, and it thereby helps in preventing lubricant slip stream in the rotating system. According to this embodiment, the lubricant drain may advantageously be arranged in a region which is positioned immediately upstream relative to the flow resistor along the rotational direction of the rotating part. Thereby the flow resistor will substantially prevent lubricant from passing the region of the housing where the lubricant drain is positioned, and the lubricant is guided towards the lubricant drain in an efficient manner.

The housing may be provided with one or more grooves arranged to guide lubricant towards the lubricant drain. According to this embodiment, when the rotating part rotates close to the housing, it forces the lubricant into the groove(s), thereby providing the pumping action. The groove(s) then guide the lubricant directly towards the lubricant drain. Thus, in this case, the forces occurring when a lubricant slip stream is created are utilised for forcing the lubricant into the groove(s) and guiding it towards the lubricant drain.

At least one groove may define a spiralling path. In this case the lubricant is forced into one end of the spiralling path, and is guided along the spiralling path until it reaches the lubricant drain. As an alternative, the groove(s) may define substantially linear path(s), e.g. arranged in such a manner that an angle is defined between the rotational direction of the rotating part and the direction of the groove(s), the angle allowing the rotating part to pump the lubricant along the groove(s) in a desired direction, and towards the lubricant drain.

The rotating part may comprise a spiral part forming a pumping geometry. According to this embodiment, the rotating part is designed in a manner which provides the pumping effect. The spiral part may, e.g., be in the form of a so-called Archimedes screw, which is designed to shovel fluid along as it rotates.

The pumping actions may take place only in a part of a region defined between the housing and the rotating part. According to this embodiment, the housing and/or the rotating part is/are designed in such a manner that they cooperate to pump lubricant towards the lubricant drain along part of the periphery defined by the rotating part, and in such a manner that pumping of lubricant does not take place along the remaining part of the periphery. As described above, this could, e.g., be achieved by arranging the rotating part with varying distance to the housing and/or by arranging a flow resistor in the housing. The cooperation between the pumping regions and the non-pumping regions provides an efficient control of the lubricant towards the lubricant drain.

According to one embodiment, the rotating system may be a gear system of a wind turbine. In this case the housing may be a gear housing and the rotating part may be a rotating gear part arranged in an interior part of the gear housing. The gear system may advantageously be a large gear system of the kind which forms part of the drive system of a wind turbine, and which is normally accommodated in a nacelle of the wind turbine. As an alternative, the gear system may be another kind of gear system used in a wind turbine, such as a gear system for a pitch drive, a gear system for a yaw drive, etc.

As an alternative, the rotating system may be a bearing supporting system, preferably for a wind turbine. In this case the housing may be a bearing housing and the rotating part may be a rotating bearing part arranged in an interior part of the bearing housing. The bearing supporting system may, e.g. form part of a main bearing, a pitch bearing, etc.

The present invention further relates to a wind turbine comprising a rotating system according to the first aspect of the invention.

According to a second aspect the invention provides a method for operating a rotating system for a wind turbine, the rotating system comprising a housing defining a lubricant drain, and a rotating part arranged in an interior part of the housing in a manner which allows rotational movements of the rotating part relative to the housing, the method comprising the step of rotating the rotating part relative to the housing, wherein rotation of the rotating part causes lubricant arranged in an interior part of the housing to be forced towards the lubricant drain.

It should be noted that a person skilled in the art would readily recognise that any feature described in combination with the first aspect of the invention could also be combined with the second aspect of the invention, and vice versa.

The method according to the second aspect of the invention may advantageously be used for operating a rotating system, such as a gear system or a bearing supporting system according to the first aspect of the invention. As described above with reference to the first aspect of the invention, the housing and/or the rotating part is/are designed in such a manner that a pumping effect is automatically obtained when the rotating part performs rotational movements relative to the housing, thereby forcing lubricant towards the lubricant drain, and out of the housing.

BRIEF DESCRIPTION OF THE DRAWINGS

The invention will now be described in further detail with reference to the accompanying drawings in which.

DETAILED DESCRIPTION OF THE DRAWINGS

Figure 1:
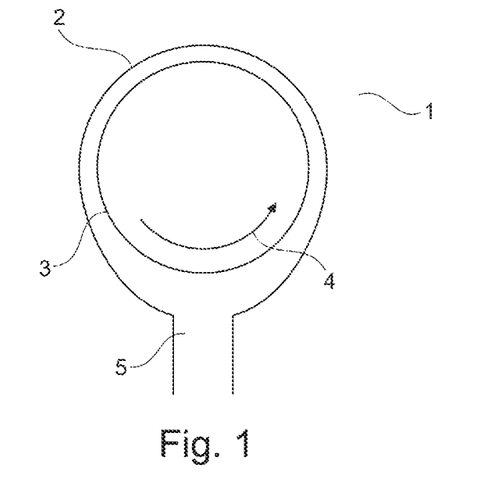
FIG. 1 is a cross sectional view of a rotating system according to a first embodiment of the invention.

FIG. 1 is a cross sectional view of a rotating system, in the form of a gear system 1, according to a first embodiment of the invention. The gear system 1 comprises a gear housing 2 and a rotating gear part 3. The rotating gear part 3 is arranged in an interior part of the gear housing 2 in such a manner that the rotating gear part 3 is allowed to rotate relatively to the gear housing 2, as indicated by arrow 4.

The rotating gear part 3 has a substantially circular cross section, i.e. it is rotationally symmetric with respect to the rotational movement illustrated by arrow 4.

The gear housing 2 has a slightly oval or egg-like shape, and the rotating gear part 3 is arranged slightly eccentrically inside the gear housing 2 in such a manner that the distance from the rotating gear part 3 to the nearest wall region of the gear housing 2 is smaller in an upper region of the gear housing 2 than in a lower region of the gear housing 2. In the lower region of the gear housing 2 a lubricant drain 5 is defined.

The gear system 1 of FIG. 1 preferably operates in the following manner. During operation, the rotating gear part 3 rotates relatively to the gear housing 2. Lubricant is contained in the interior part of the gear housing 2 in order to provide sufficient lubrication for the rotating gear part 3. In the lower region of the gear housing 2, lubricant tends to move away from the rotating gear part 3, partly due to the force of gravity, and partly due to the increased distance between the rotating gear part 3 and the gear housing 2 as compared to the upper region of the gear housing 2. Since the lubricant drain 5 is arranged in this part of the gear housing 2, the lubricant is thereby guided towards the lubricant drain 5, i.e. it is ensured that excess lubricant leaves the interior part of the gear housing 2. Simultaneously, the small distance between the gear housing 2 and the rotating gear part 3 in the upper region of the gear housing 2 provides a pumping action of lubricant towards the lower region of the gear housing 2 when the rotating gear part 3 rotates relatively to the gear housing 2. Accordingly, the shape of the gear housing 2 and the position of the lubricant drain 5 in combination provides a pumping action which forces lubricant towards the lubricant drain 5, and thereby out of the gear housing 2 and away from the gear system 1, when the rotating gear part 3 rotates relatively to the gear housing 2. Thereby it is ensured that sufficient lubricant is available for the rotating gear part 3, while preventing a slip stream of lubricant. Accordingly, the friction occurring in the gear system 1 is considerably reduced, and the efficiency of the gear system 1 is therefore increased.

Furthermore, by designing the gear housing 2 in such a manner that the distance between the rotating gear part 3 and the gear housing 2 is larger in the lower region of the gear housing 2 than in the upper region of the gear housing 2, the increased distance is only present in a required region of the gear housing 2, the distance being minimised in the remaining part of the gear housing 2. Thereby the overall dimensions of the gear system 1 are minimised.

Figure 2:
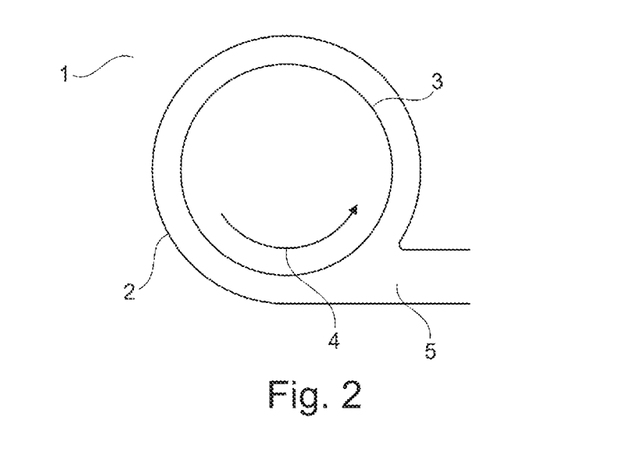
FIG. 2 is a cross sectional view of a rotating system according to a second embodiment of the invention.

FIG. 2 is a cross sectional view of a gear system 1 according to a second embodiment of the invention. Similarly to the gear system 1 of FIG. 1, the gear system 1 of FIG. 2 comprises a gear housing 2 and a rotating gear part 3 arranged in an interior part of the gear housing 2. The rotating gear part 3 is arranged rotatably relatively to the gear housing 2 as illustrated by arrow 4.

The gear housing 2 is provided with a lubricant drain 5 which is arranged in a lower region of the gear housing 2.

During operation of the gear system 1 of FIG. 2, the rotating gear part 3 rotates relatively to the gear housing 2. Lubricant is contained in the interior part of the gear housing 2 in order to provide lubrication for the rotating gear part 3. The lubricant drain 5 is arranged in a position which ensures that lubricant being moved along with the rotating gear part 3 is flung towards the lubricant drain 5 due to the movement of the rotating gear part 3. Thereby the shape of the gear housing 2 and the position of the lubricant drain 5 ensure that excess lubricant is pumped towards the lubricant drain 5 when the rotating gear part 3 rotates relatively to the gear housing 2. Accordingly, a pumping action is provided, and the advantages described above with reference to FIG. 1 are obtained.

Figure 3:
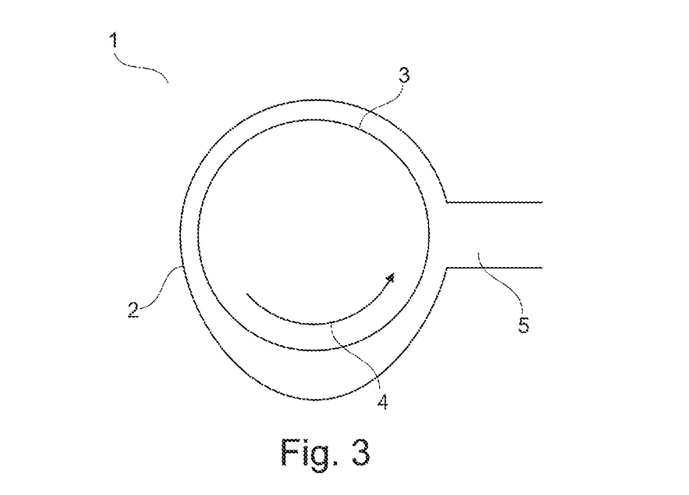
FIG. 3 is a cross sectional view of a rotating system according to a third embodiment of the invention.

FIG. 3 is a cross sectional view of a gear system 1 according to a third embodiment of the invention. The gear system 1 comprises a gear housing 2 and a rotating gear part 3, the rotating gear part 3 being arranged rotatably in an interior part of the gear housing 2 as illustrated by arrow 4.

Similarly to the embodiment illustrated in FIG. 1, the gear housing 2 illustrated in FIG. 3 has an oval shape, the rotating gear part 3 thereby being arranged with a larger distance to the wall of the gear housing 2 in a lower region of the gear housing 2 than in an upper region of the gear housing 2. As described above, this ensures that excess lubricant leaves the rotating gear part 3 in the lower region of the gear housing 2, thereby reducing the lubricant slip stream.

Furthermore, a lubricant drain 5 is formed in the gear housing 2 in a position corresponding to the position of the lubricant drain 5 illustrated in FIG. 2. As described above, this ensures that excess lubricant is flung towards the lubricant drain 5 as the rotating gear part 3 rotates relatively to the gear housing 2.

Thus, the embodiment illustrated in FIG. 3 is a combination of the embodiment of FIG. 1 and the embodiment of FIG. 2. Accordingly, the shape of the gear housing 2 and the position of the lubricant drain 5 in combination provide a pumping action forcing lubricant towards the lubricant drain 5 when the rotating gear part 3 rotates relatively to the gear housing 2, thereby ensuring that excess lubricant leaves the gear housing 2 and preventing or reducing lubricant slip stream as described above.

Figure 4:
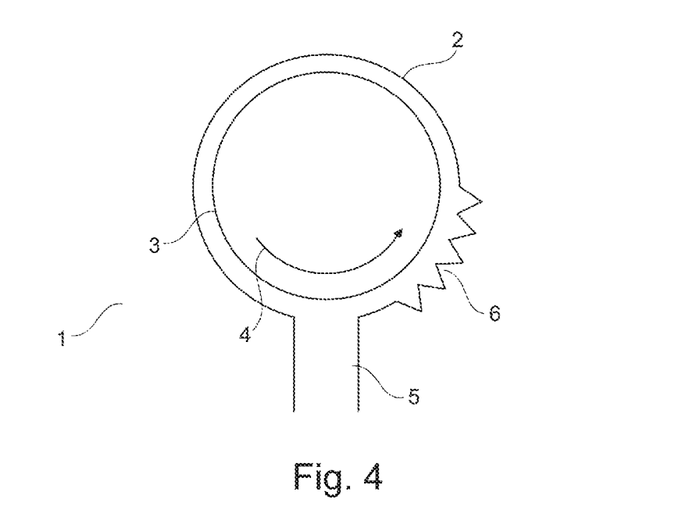
FIG. 4 is a cross sectional view of a rotating system according to a fourth embodiment of the invention.

FIG. 4 is a cross sectional view of a gear system 1 according to a fourth embodiment of the invention. The gear system 1 comprises a gear housing 2 and a rotating gear part 3 arranged rotatably in an interior part of the gear housing 2 as illustrated by arrow 4. A lubricant drain 5 is arranged in a lower region of the gear housing 2.

A flow resistor 6 is formed in a wall part of the gear housing 2 in a position which is downstream relatively to the lubricant drain 5 along the direction of the movement of the rotating gear part 3. The flow resistor 6 increases the flow resistance in this region, thereby inhibiting lubricant flow. Thus, excess lubricant being moved along with the rotating gear part 3 during operation, is prevented from leaving the region accommodating the lubricant drain 5, and it is therefore forced to leave the gear housing 2 via the lubricant drain 5. Accordingly, the design of the gear housing 2 provides a pumping action forcing lubricant towards the lubricant drain 5 as the rotating gear part 3 rotates relatively to the gear housing, thereby preventing or reducing lubricant slip stream as described above.

Figure 5A:
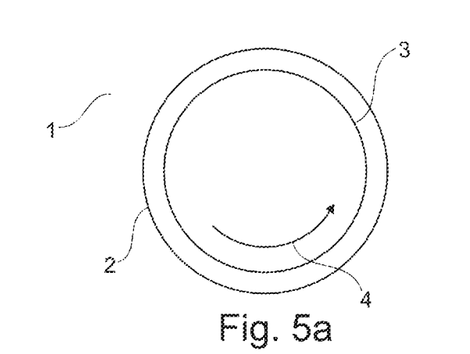
FIGS. 5a and 5b are cross sectional views of a rotating system according to a fifth embodiment of the invention.

FIG. 5a is a cross sectional view of a gear system 1 according to a fifth embodiment of the invention. The gear system 1 comprises a gear housing 2 and a rotating gear part 3 arranged rotatably in an interior part of the gear housing 2, as illustrated by arrow 4.

Figure 5B:
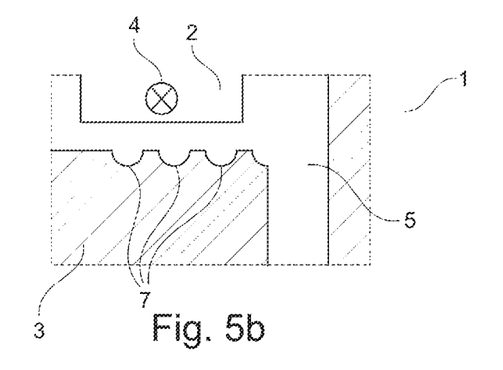

FIG. 5b is a cross sectional view of the gear system 1 of FIG. 5a along a direction being substantially perpendicular to the cross section of FIG. 5a. In FIG. 5b it can be seen that the gear housing 3 is provided with grooves 7. The grooves 7 shown in FIG. 5b may all form part of the same spiral, said spiral being capable of guiding lubricant towards lubricant drain 5. Thus, lubricant is collected in the grooves 7. When the rotating gear part 3 rotates relatively to the gear housing 2, a slip stream is created which drags the lubricant collected in the grooves 7 along. Thereby the lubricant is forced along the spiral formed by the grooves 7 until it reaches the lubricant drain 5. Accordingly, the grooves 7 ensure that a pumping action is provided when the rotating gear part 3 rotates relatively to the gear housing 2.

As an alternative, the gear housing 2 may be provided with grooves which provide substantially parallel lubricant paths directly towards the lubricant drain 5, e.g. arranged with an angle to the direction of the rotating movement of the rotating gear part 3. In this case lubricant collected in the grooves is pumped directly towards the lubricant drain 5 due to the created slip stream when the rotating gear part 3 rotates relatively to the gear housing 2.

In any event, the design of the gear housing 2 with the grooves 7 formed therein provides a pumping action forcing lubricant towards the lubricant drain 5 as the rotating gear part 3 rotates relatively to the gear housing 2.

Figure 6A:
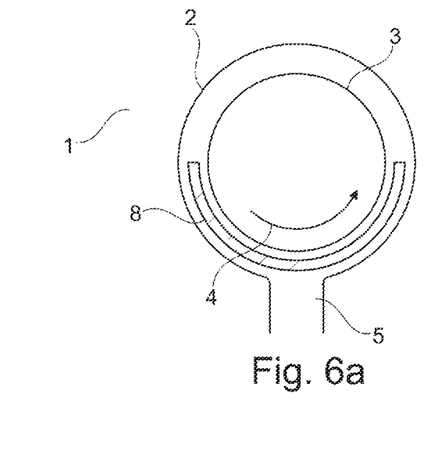
FIGS. 6a and 6b are cross sectional views of a rotating system according to a sixth embodiment of the invention.

FIG. 6a is a cross sectional view of a gear system 1 according to a sixth embodiment of the invention. The gear system 1 comprises a gear housing 2 and a rotating gear part 3 arranged rotatably in an interior part of the gear housing 2 as indicated by arrow 4. The gear housing 2 is provided with a lubricant drain 5 in a lower region thereof.

A separator 8 is arranged in the interior part of the gear housing 2, in a region between the rotating gear part 3 and the lubricant drain 5. Lubricant being dragged along with the rotating gear part 3 as it rotates relatively to the gear housing 2 is separated when it reaches the separator 8. Thereby some lubricant is dragged along with the rotating gear part 3 in the region between the rotating gear part 3 and the separator 8, thereby ensuring sufficient lubrication for the rotating gear part 3. However, any excess lubricant is guided into the region between the separator 8 and the gear housing 2, and is thereby guided towards the lubricant drain 5. Thereby excessive lubricant slip stream is avoided.

Figure 6B:
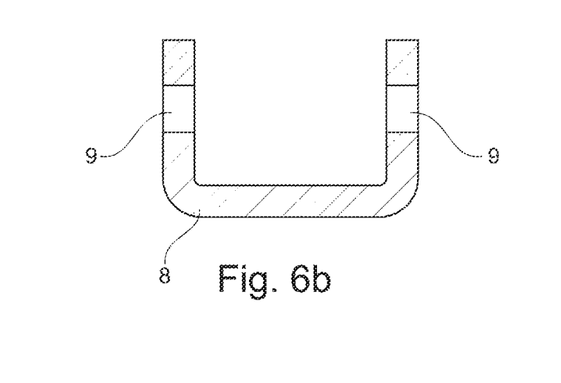

FIG. 6b is a cross sectional view of the separator 8 illustrated in FIG. 6a. The separator 8 is provided with holes 9 in sidewalls thereof. Lubricant may pass from the region between the separator 8 and the rotating gear part 3 to the region between the separator 8 and the gear housing 2 via the holes 9. Thereby even more lubricant is guided towards the lubricant drain 5 as the rotating gear part 3 rotates relatively to the gear housing 2.

The gear system 1 of FIGS. 6a and 6b may further be provided with additional means for providing a pumping action of lubricant towards the lubricant drain 5, e.g. one or more of the means described above with reference to FIGS. 1-5b.

Figures 7A, 7B, 7C:
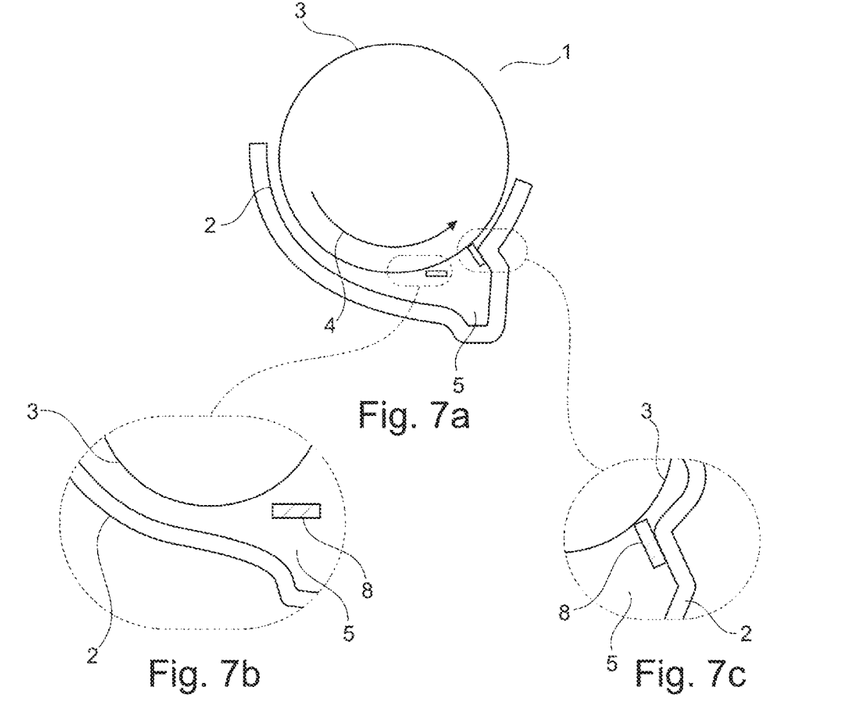
FIG. 7a is a cross sectional view of a rotating system according to a seventh embodiment of the invention.
FIGS. 7b and 7c show details of the rotating system of FIG. 7a, FIG. 8 is a cross sectional view of a rotating system according to an eighth embodiment of the invention.

FIG. 7a is a cross sectional view of a gear system 1 according to a seventh embodiment of the invention. The gear system 1 comprises a gear housing 2 and a rotating gear part 3 arranged rotatably in an interior part of the gear housing 2 as indicated by arrow 4. A lubricant drain 5 is formed as an integral part of the gear housing 2. The distance between the rotating gear part 3 and the gear housing 2 increases towards the lubricant drain 5 along the rotating direction of the rotating gear part 3. This provides a pumping action forcing lubricant towards the lubricant drain 5 as the rotating gear part 3 rotates relatively to the gear housing 2, similarly to the embodiments described above with reference to FIGS. 1 and 3.

FIGS. 7b and 7c show details of the gear system 1 of FIG. 7a, illustrating two different ways of arranging a separator 8 in the interior part of the gear housing 2. In FIG. 7b a separator 8 in the form of a steel sheet is arranged at a position corresponding to the lubricant drain 5. The separator 8 is arranged in such a manner that excess lubricant is 'scraped off' and guided into the lubricant drain 5.

In FIG. 7c a separator 8 in the form of a rubber 'scraper' is arranged at a position immediately downstream relatively to the lubricant drain 5 in the rotating direction of the rotating gear part 3. In this case the separator 8 prevents excess lubricant from passing the position of the lubricant drain 5. As a consequence, the excess lubricant is guided into the lubricant drain 5.

Figure 8:
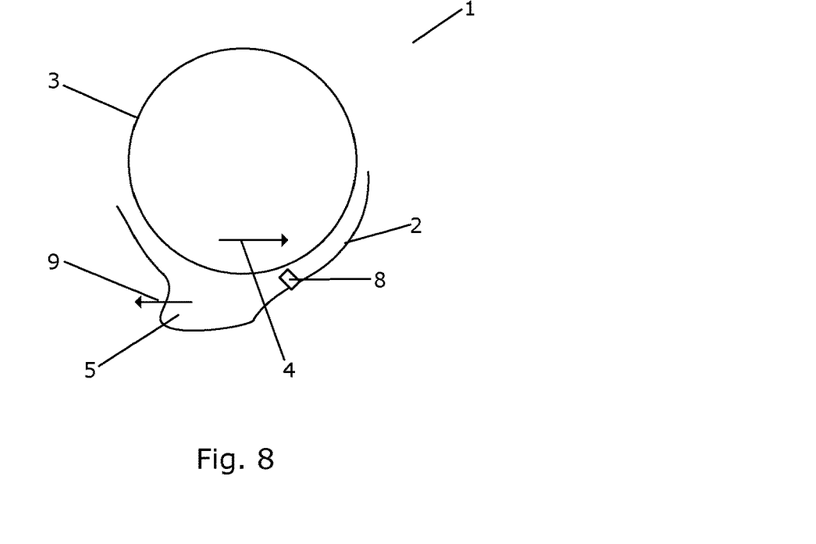

FIG. 8 is a cross sectional view of a gear system 1 according to an eighth embodiment of the invention. The gear system 1 is very similar to the gear system of FIG. 7a. However, in the embodiment shown in FIG. 8, the lubricant drain 5 is arranged in such a manner that the lubricant is pumped in a direction which is substantially reversed as compared to the direction of movement 4 of the rotating gear part 3, as illustrated by arrow 9. Thus, in the embodiment shown in FIG. 8, the shape and position of the lubricant drain 5, in cooperation with the separator 8 pumps the lubricant towards the lubricant drain 5 as the rotating gear part 3 rotates relative to the gear housing 2.

Figure 9:
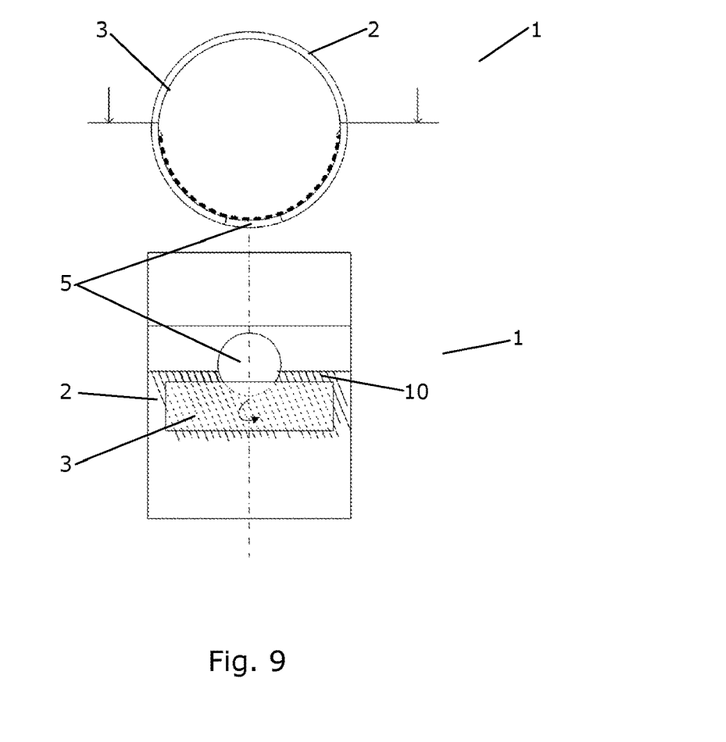
FIG. 9 shows cross sectional views of a rotating system according to an ninth embodiment of the invention, along different directions.

FIG. 9 shows cross sectional views of a gear system 1 according to a ninth embodiment of the invention, along two different directions. It can be seen from the lower part of FIG. 9 that the gear housing 2 has a plurality of grooves 10 formed in a surface thereof, in a region near the lubricant drain 5. The grooves 10 are arranged in such a manner that they define an angle with respect to the direction of movement of the rotating gear part 3.

When the rotating gear part 3 rotates relative to the gear housing 2, lubricant is caught in the grooves 10. As the rotating gear part 3 continues to rotate, the lubricant caught in the grooves 10 is forced along, and due to the angle between the grooves 10 and the direction of movement of the rotating gear part 3, the lubricant is thereby forced towards the lubricant drain 5. Accordingly, the grooves 10 formed in the gear housing 2 ensures that a pumping effect is provided when the rotating gear part 3 rotates relative to the gear housing 2, thereby pumping lubricant towards the lubricant drain 5.

The invention claimed is:

1. A rotating system for a wind turbine, the rotating system comprising:
   a housing defining an interior part and an exterior part and including an upper region and a lower region,
   a lubricant drain extending from the interior part of the housing towards the exterior part of the housing and arranged in the lower region of the housing, and
   a rotating part accommodated in the interior part of the housing in a manner which allows rotational movements of the rotating part relative to the housing, and in such a manner that lubricant can be contained between the housing and the rotating part,
   wherein the rotating part is arranged in the interior part of the housing in such a manner that the rotating part is arranged closer to a wall of the housing in the upper region of the housing than in the lower region of the housing so as to provide a pumping action forcing lubricant arranged in the interior part of the housing towards the lubricant drain during rotational movements of the rotating part relative to the housing.

2. The rotating system according to claim 1, wherein the housing has an elliptical cross sectional shape.

3. The rotating system according to claim 1, wherein the housing defines a flow resistor arranged to inhibit lubricant flow in the region accommodating the flow resistor.

4. The rotating system according to claim 1, wherein the housing is provided with one or more grooves arranged to guide lubricant towards the lubricant drain.

5. The rotating system according to claim 4, wherein at least one groove defines a spiralling path.

6. The rotating system according to claim 1, wherein the rotating part comprises a spiral part forming a pumping geometry.

7. The rotating system according to claim 1, wherein the pumping actions take place only in a part of a region defined between the housing and the rotating part.

8. The rotating system according to claim 1, wherein the rotating system is a gear system of a wind turbine, and wherein the housing is a gear housing and the rotating part is a rotating gear part arranged in an interior part of the gear housing.

9. The rotating system according to claim 1, wherein the rotating system is a bearing supporting system, and wherein the housing is a bearing housing and the rotating part is a rotating bearing part arranged in an interior part of the bearing housing.

10. A wind turbine comprising a rotating system according to claim 1.

11. The rotating system according to claim 1, wherein the housing has an ovoid cross sectional shape.

12. A method for operating a rotating system for a wind turbine, the rotating system comprising:
   a housing defining an interior part and an exterior part and including an upper region and a lower region,
   a lubricant drain extending from the interior part of the housing towards the exterior part of the housing and arranged in the lower region of the housing, and
   a rotating part arranged in the interior part of the housing in such a manner that the rotating part is arranged closer to a wall of the housing in the upper region of the housing than in the lower region of the housing and in a manner which allows rotational movements of the rotating part relative to the housing, the method comprising the step of rotating the rotating part relative to the housing, wherein rotation of the rotating part causes lubricant arranged in the interior part of the housing to be forced towards the lubricant drain.

\* \* \* \* \*